Patented Aug. 18, 1925.

1,549,779

UNITED STATES PATENT OFFICE.

ROBERT B. MacMULLIN AND RALPH E. GEGENHEIMER, OF NIAGARA FALLS, NEW YORK, ASSIGNORS TO THE MATHIESON ALKALI WORKS, INC., OF NEW YORK, N. Y., A CORPORATION OF VIRGINIA.

PRODUCTION OF ALCOHOLS.

No Drawing.  Application filed August 25, 1921. Serial No. 495,357.

*To all whom it may concern:*

Be it known that we, ROBERT B. MAC-MULLIN and RALPH E. GEGENHEIMER, both citizens of the United States, and both residing at Niagara Falls, in the county of Niagara, State of New York, have invented certain new and useful Improvements in the Production of Alcohols; and we do hereby declare the following to be a full, clear, and exact description of the invention, such as will enable others skilled in the art to which it appertains to make and use the same.

This invention relates to improvements in the manufacture of alcohols from alkyl chlorides, and more particularly to the manufacture of methyl alcohol or methanol from methyl chloride.

If methyl chloride vapors are passed over dry lime at an elevated temperature and at atmospheric pressure, the methyl chloride will be converted in part to methyl alcohol, but this process is inefficient and the yields obtained are low, owing to the excessive decomposition of both the methyl chloride and the methyl alcohol. In the case of methyl alcohol, for example, decomposition takes place at elevated temperatures with the production of different decomposition products, including carbon monoxide and hydrogen, and the carbon monoxide is removed to a considerable extent through action with water and lime to form calcium carbonate. At a temperature of around 500° C. and at atmospheric pressure this decomposition is practically complete.

The present invention is based upon the discovery that radically increased yields of methyl alcohol or methanol can be produced from methyl chloride by passing the methyl chloride into contact with dry lime in the presence of highly superheated steam with effective control of the conditions of the reactions, such as the temperature, pressure, time of contact, and amount of superheated steam.

Our investigations have indicated that the first stage of the reaction is between methyl chloride and superheated steam with resulting production of methyl alcohol and hydrochloric acid, as illustrated by the following equation:

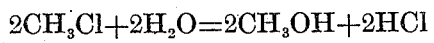

and that the hydrochloric acid gas then reacts with lime as indicated by the following equation:

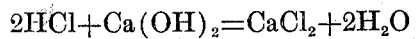

If water vapor is not added to the methyl chloride when it is passed over the highly heated lime, the methyl alcohol formed will tend to decompose, and to be converted into dimethyl ether. Our investigations indicate that the mixture of lime and the anhydrous calcium chloride which is produced coincidently with the methyl alcohol, promotes this decomposition of the methyl alcohol to ether; and it seems probable that this reaction is catalytic in character and not merely a dehydrating action of the calcium chloride, as the amount of ether formed does not correspond directly to the amount of water found associated with the calcium chloride at the completion of the reaction.

We have found, however, that when water vapor is added to the methyl chloride in about equimolal proportion,—that is, to give a concentration of water-vapor equal to 45 to 60% by volume of the mixture, the decomposition of the methyl alcohol into ether will be practically eliminated, and that greatly increased yields of the methyl alcohol can be directly obtained. The amount of water vapor thus added, and the proportion of water vapor to methyl chloride, are capable of some variation, but the rate of formation of methyl alcohol is greatest when the water and methyl chloride are mixed in equimolal proportion.

We have also found that the objectionable decomposition can be inhibited and the rate of reaction and output of the apparatus, as well as the yields, greatly increased, by carrying out the reaction at a high pressure. For example, by increasing the pressure from atmospheric to about 15 atmospheres, the concentration and rate of reaction of the gases will be correspondingly increased, thereby increasing the capacity of the apparatus; or an apparatus of radically reduced size may be used to obtain an equivalent capacity for methyl alcohol production.

We have also found it of importance in conducting the process to control the time during which the methyl chloride and steam are heated together in the presence of lime in the furnace. If this time of contact is short, such as 4 seconds, the methyl chloride gas is incompletely converted to methyl alcohol in passing through or in contact with the lime, especially if most of the lime has been converted to calcium chloride. The excess methyl chloride gas will carry out with it the methyl alcohol which will not condense, and, if this excess methyl chloride gas is reused in the furnace, the non-condensable methyl alcohol will gradually decompose because of its lengthened time of contact in the furnace. However, by allowing a relatively long time of contact of the gaseous mixture of methyl chloride and steam with the lime, such as 40 seconds, there is little excess methyl chloride gas coming from the furnace and consequently little non-condensable methyl alcohol is recirculated. In other words, the yield of condensed methyl alcohol corresponds substantially to the efficiency of the conversion in the furnace. Moreover, if the time of contact is short, such as 4 seconds, the excess methyl chloride gas carries with it the excess water vapor, which condenses out in the alcohol condenser, thus unnecessarily diluting the methyl alcohol. However, by allowing a longer reaction time, such as 40 seconds, the amount of methyl chloride and water vapor carried over to the condenser is decreased and the concentration of the methyl alcohol produced is therefore higher.

The increase in the time of contact of the gases with the heated lime can be brought about in different ways, for example, by increasing the size of the furnace, or by reducing the rate of flow of the gases passing through the furnace, or by increasing the pressure of the reacting gases. The size of the furnace will usually be limited by practical considerations, while any considerable reduction in the rate of flow of the gases will correspondingly reduce the capacity of the furnace. An increase in pressure will, however, correspondingly lengthen the effective time of contact of the gases with the lime; and we have found a working pressure of around 15 atmospheres to be satisfactory for this purpose and to give an increased effective time of contact and resulting yields.

The furnace used in the process can be somewhat varied in its size and shape. Since the rate of reaction increases with an increase in linear velocity of the gases, it is advantageous to make the furnace of considerable length as compared with its diameter or cross-section. Such a type of furnace also facilitates the transmission of heat to the reaction mixture. In the case of a cylindrical furnace we recommend a ratio of length to diameter of at least 9 to 1, that is, a furnace of least nine times as long as its diameter.

The temperature of the process can be somewhat varied, but we have found the most favorable conditions for operating to be at temperatures between 350 and 450° C. and preferably around 400° C. If the temperature is too high, objectionable decomposition is increased, while at the temperatures specified and operating under pressure and with the admixture of superheated steam, this objectionable decomposition can be reduced to a minimum.

In carrying out the process of the present invention, the various features which we have referred to can be combined to particular advantage, that is, the process can be carried out with high yields of methyl alcohol and with a high efficiency of conversion, and with reduction of objectionable decomposition, by maintaining a regulated temperature between about 350° and 450° C. and by the use of a high pressure, for example, around 175 to 200 lbs. gage pressure, and by admitting water vapor with the methyl chloride in about equimolal proportion, and by maintaining a time of contact of the reacting gases and lime of about 40 seconds or more.

By operating in the manner described we have found it possible to obtain an efficiency of over 90% in the conversion of the methyl chloride to methyl alcohol; whereas by passing methyl chloride gas through dry lime at atmospheric pressure and at temperatures between 300 and 500° C., the efficiency was only around 35%. Even at atmospheric pressure, we have found it possible to obtain a high efficiency in the presence of about 45% of water vapor admixed with the methyl chloride, but the yield obtained was lower than when the process was carried out under a high pressure. For example, at atmospheric pressure and at a temperature of about 420° C. and with about 45% of water vapor present with the methyl chloride, we have obtained an efficiency of over 90% and a yield of about 60%, while at a pressure of around 220 lbs. per square inch, gage pressure, and at a similar temperature, we have obtained an efficiency of over 90% and a yield of over 80%. In another instance, at a temperature of 417° C., with a gage pressure of about 176 lbs., and a content of water vapor of about 67%, we have obtained a yield of upwards of 90% and a conversion also above 90%.

It will be understood that the lime is not entirely consumed in hydrolyzing the methyl chloride. The rate of reaction appears to be proportional to the surface of lime exposed, and when the effective surface of the lime has been greatly reduced, it may be more advantageous, from the standpoint of time economy, to stop the reaction and introduce a fresh charge of lime. The process can, for example, be stopped when only 50 to 75% of the lime is converted to calcium chloride. The lime used in the process is powdered slaked lime, that is, calcium hydroxide, and may be made, for example, by slaking burnt lime with steam.

The methyl alcohol or methanol produced by the process will contain water, but it can be rectified in suitable distilling apparatus to produce concentrated or anhydrous methanol. In carrying out the process, the methyl chloride can be produced in any suitable way or obtained from any suitable source, for example, by the chlorination of methane. The superheated steam used in the process may be superheated before it is admixed with the methyl chloride vapor or the mixed vapors may be suitably heated in the preliminary part of the apparatus before they reach the reaction chamber. The gases produced, escaping from the reaction chamber, may be passed to any suitable condenser for the condensation of the methyl alcohol and admixed water vapor; and the methyl alcohol can then be distilled to obtain a concentrated or anhydrous product.

While, for best results, we recommend that all of the various conditions which we have found advantageous be used in the practise of the invention, yet it will be understood that certain of the advantages of the invention can be obtained if a part only of these conditions are used; and we do not accordingly desire to limit ourselves to the combined use of all of these features except as indicated in the appended claims. For example, a high efficiency, but with a somewhat decreased yield, will be obtained at atmospheric pressure, as compared with a high pressure of around 200 lbs. Similarly, an increased efficiency and yield will be obtained, even at atmospheric pressure, in the presence of a regulated amount of water vapor, as compared with a process in which no water vapor is used; but we have found that the best yields and the highest efficiencies are obtained by the conjoint observation of the various conditions hereinbefore set forth.

While we have described our invention more particularly in connection with the production of methyl alcohol from methyl chloride and with the use of lime as the alkaline agent for the conversion, yet it will be understood that other alcohols may be produced from alkyl chlorides other than methyl chloride in a similar way and that other alkalies, either alone or in admixture, can also be used.

We claim:

1. The method of producing alcohols which comprises passing an alkyl chloride admixed with superheated steam over an alkaline substance at a temperature of about 350 to 450° C. and at a pressure greater than atmospheric.

2. The method of producing alcohols which comprises passing an alkyl chloride admixed with superheated steam over lime under a high pressure.

3. The method of producing alcohols which comprises passing an alkyl chloride admixed with superheated steam in approximately equimolal proportion over lime under a high pressure.

4. The method of producing methyl alcohol which comprises passing methyl chloride admixed with superheated steam over lime at a temperature of about 350 to 450° C.

5. The method of producing methyl alcohol which comprises passing methyl chloride admixed with superheated steam over lime at a temperature of about 350 to 450° C. and at a pressure greater than atmospheric.

6. The method of producing methyl alcohol which comprises passing methyl chloride admixed with superheated steam over lime at a temperature of about 350° to 450° C. and regulating the time of contact so that the reacting gases are in contact with the heated lime for 40 seconds or more.

7. The method of producing methyl alcohol which comprises passing methyl chloride admixed with superheated steam, in about equimolal proportion, over lime at a temperature of about 350 to 450° C.

8. The method of producing methyl alcohol which comprises passing methyl chloride admixed with about an equal volume of superheated steam over lime at a temperature of about 350 to 450° C. and at a pressure of about 175 to 200 lbs.

9. The method of producing methyl alcohol which comprises passing methyl chloride admixed with an equal volume of superheated steam over lime at a temperature of about 350 to 450° C. and regulating the process to maintain a time of contact of the reactive gases with the lime of 40 seconds or more.

10. Process of hydrolyzing an alkyl chloride, comprising passing the same admixed with steam, in approximately equimolal proportion, over an alkaline earth metal hydroxide at an elevated temperature.

11. The method of producing alcohols which comprises passing an alkyl chloride admixed with superheated steam over an alkaline substance under a high pressure.

12. The method of producing alcohols which comprises passing an alkyl chloride admixed with superheated steam over an alkaline substance at a temperature of about 350 to 450° C.

13. The method of producing alcohols, which comprises superheating steam and passing a mixture which includes the superheated steam and an alkyl chloride over an alkaline substance.

14. The method of producing alcohols, which comprises superheating steam and passing a mixture which includes the superheated steam and an alkyl chloride over an alkaline earth metal hydroxide.

15. The method of producing alcohols, which comprises admixing superheated steam and an alkyl chloride and passing the mixture over an alkaline substance.

16. The method of producing alcohols, which comprises superheating steam and passing a mixture including the superheated steam and an alkyl chloride over lime under a high pressure.

17. The method of producing alcohols, which comprises superheating steam and passing a mixture including the superheated steam over an alkyl chloride in approximately equimolal proportion over lime under a high pressure.

18. The method of producing methyl alcohol, which comprises superheating steam and passing a mixture including the superheated steam and methyl chloride over lime at a temperature of about 350 to 450° C.

19. The method of producing methyl alcohol, which includes superheating steam and passing a mixture including the superheated steam and methyl chloride over lime at a temperature of about 350 to 450° C. and at a pressure greater than atmospheric.

20. The method of producing methyl alcohol, which comprises superheating steam and passing a mixture including the superheated steam and methyl chloride in about equimolal proportion over lime at a temperature of about 350 to 450° C.

21. The method of producing methyl alcohol, which comprises superheating steam and passing a mixture including about equal volumes of the superheated steam and methyl chloride over lime at a temperature of about 350 to 450° C. and at a pressure of about 175 to 200 lbs.

In testimony whereof we affix our signatures.

ROBERT B. MacMULLIN.
RALPH E. GEGENHEIMER.